United States Patent
Hagai et al.

(10) Patent No.: US 9,684,480 B2
(45) Date of Patent: Jun. 20, 2017

(54) SERVER RECEIVING IMAGE DATA FROM TERMINAL DEVICE AND GENERATING PRINT DATA BASED ON IMAGE DATA

(71) Applicant: BROTHER KOGYO KABUSHIKI KAISHA, Nagoya, Aichi (JP)

(72) Inventors: Naoki Hagai, Komaki (JP); Hironori Harada, Chiryu (JP); Kan Ishimoto, Seto (JP); Hiroaki Sugiyama, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/753,381

(22) Filed: Jun. 29, 2015

(65) Prior Publication Data

US 2015/0378657 A1 Dec. 31, 2015

(30) Foreign Application Priority Data

Jun. 30, 2014 (JP) ................................. 2014-133864

(51) Int. Cl.
*H04N 1/32* (2006.01)
*H04N 1/04* (2006.01)
(Continued)

(52) U.S. Cl.
CPC .......... *G06F 3/1257* (2013.01); *G06F 3/1208* (2013.01); *G06F 3/1255* (2013.01);
(Continued)

(58) Field of Classification Search
CPC .... G06F 3/1208; G06F 3/1257; G06F 3/1292; G06F 3/1287; G06F 3/1288;
(Continued)

(56) References Cited

U.S. PATENT DOCUMENTS 9,317,227 B2* 4/2016 Yamagishi ............ G06F 3/1208
2007/0109587 A1* 5/2007 Yamakawa ........ H04N 1/00204
358/1.14
(Continued)

FOREIGN PATENT DOCUMENTS

JP 2003-051943 A 2/2003
JP 2007-134935 A 5/2007
JP 2012-205249 A 10/2012

OTHER PUBLICATIONS

"What is Google Cloud Print?", retrieved from the internet on Feb. 7, 2014, URL: https://developers.google.com/cloud-print/docs/overview.

*Primary Examiner* — Iriana Cruz

(74) *Attorney, Agent, or Firm* — Scully, Scott, Murphy & Presser, P.C.

(57) ABSTRACT

A server receives parameter-related data and sheet information from a first terminal device, determines a printing parameter based on the parameter-related data, registers, in a storage device, the printing parameter in association with registration-sheet information indicative of a sheet indicated by the sheet information received from the first terminal device, transmits, to a second terminal device, a list of sheets indicated by registration-sheet information registered in the storage device, receives a print command from the second terminal device, generates print data by using: the image data included in the print command; and a printing parameter associated with target sheet information, and transmits the print data to a printing device. The target sheet information is registration-sheet information indicative of a sheet specified by sheet-specifying data included in the print command. The print data is used for printing an image on the sheet specified by the sheet-specifying data.

9 Claims, 10 Drawing Sheets

REGISTRATION TABLE — G11

| PRINTING PARAMETER | | RATING VALUE | AGGREGATION TABLE |
|---|---|---|---|
| BRIGHTNESS CORRECTION LEVEL | COLOR CONVERSION PROFILE | | |
| 111 | CP3 | 15 | E1 |
| 132 | CP4 | 13.5 | E2 |
| ⋮ | ⋮ | ⋮ | ⋮ |

(51) Int. Cl.
*H04N 1/00* (2006.01)
*G06F 3/12* (2006.01)

(52) U.S. Cl.
CPC .......... *G06F 3/1287* (2013.01); *G06F 3/1288* (2013.01); *G06F 3/1292* (2013.01)

(58) Field of Classification Search
CPC .............. G06F 3/1255; H04N 1/32117; H04N 1/00095; H04N 1/00217; H04N 1/00344; H04N 1/04; H04N 2201/0094
See application file for complete search history.

(56) References Cited

U.S. PATENT DOCUMENTS

| | | | | |
|---|---|---|---|---|
| 2015/0234628 A1* | 8/2015 | Nakamura | ............ | G06F 3/1298 358/1.13 |
| 2015/0242722 A1* | 8/2015 | Watanabe | ............ | G06F 3/1205 358/1.15 |

* cited by examiner

FIG.2

MAIN TABLE MT

| REGION INFORAMTION RI | SHEET INFORAMTION SI | | RECORD TABLE | REGISTRATION TABLE |
|---|---|---|---|---|
| | MANUFACTURES | PRODUCT NO. | | |
| JAPAN | A | ST0001 | R11 | G11 |
| | B | ST0002 | R12 | G12 |
| | ⋮ | ⋮ | ⋮ | ⋮ |
| CHINA | E | ES0001 | R21 | G21 |
| | F | FS0001 | R22 | G22 |
| | ⋮ | ⋮ | ⋮ | ⋮ |
| ⋮ | ⋮ | ⋮ | ⋮ | ⋮ |

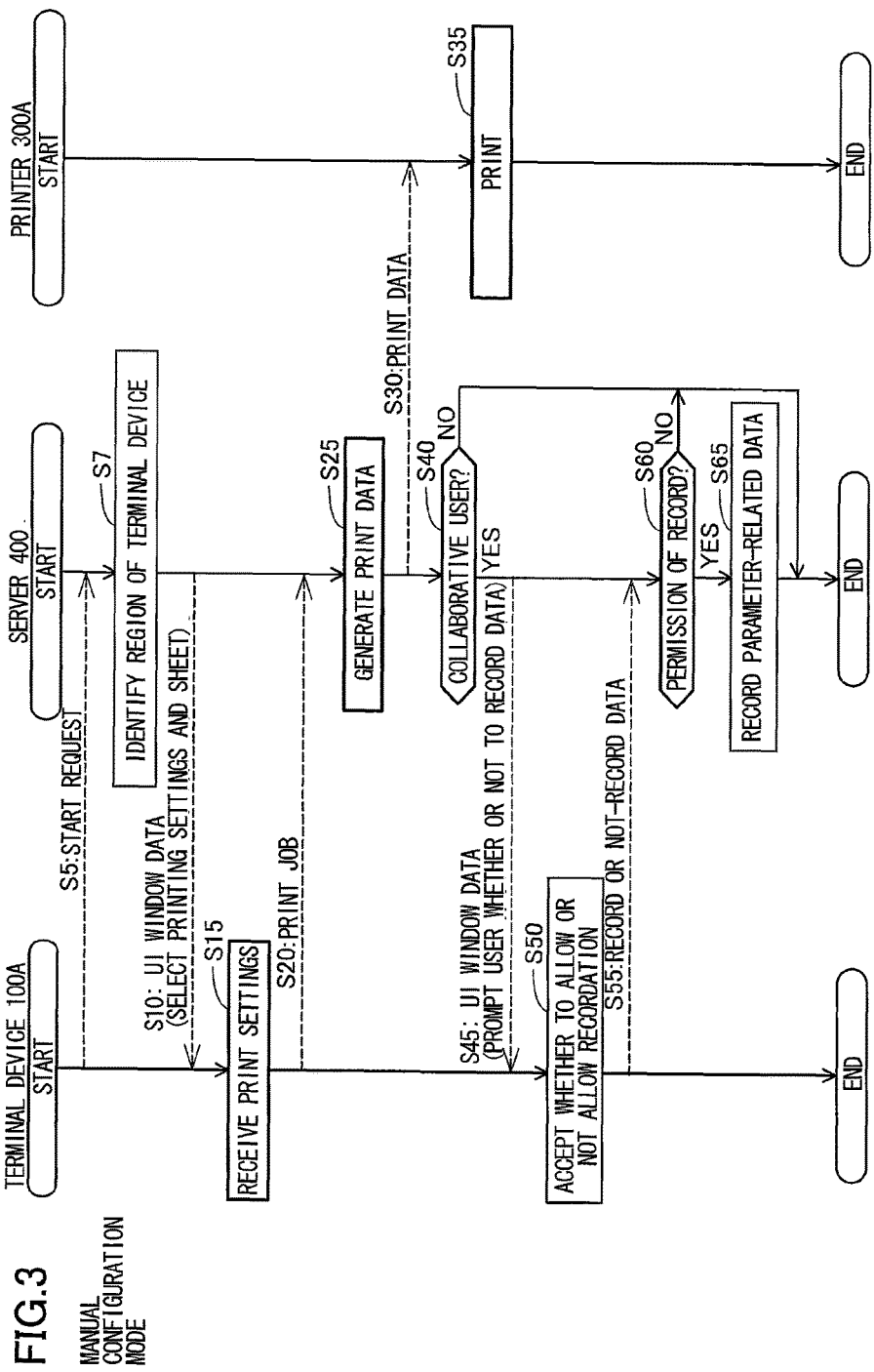

$$Pout = 255 \times \left(\frac{Pin}{255}\right)^{\frac{1}{\gamma}}$$

PRINT JOB                                              PJ1
- IMAGE DATA
- SHEET INFORAMTION SI (MANUFACTURER, PRODUCT NO.)
- BRIGHTNESS CORRETION LEVEL CL
- DATA INDICATIVE OF COLOR CONVERSION PROFILE CP

RECORD TABLE                R11

| PARAMETER-RELATED DATA | |
|---|---|
| BRIGHTNESS CORRECTION LEVEL | COLOR CONVERSION PROFILE |
| 90 | CP1 |
| 125 | CP4 |
| ⋮ | ⋮ |

FIG.9

REGISTRATION TABLE G11

| PRINTING PARAMETER || RATING VALUE | AGGREGATION TABLE |
|---|---|---|---|
| BRIGHTNESS CORRECTION LEVEL | COLOR CONVERSION PROFILE | | |
| 111 | CP3 | 15 | E1 |
| 132 | CP4 | 13.5 | E2 |
| ⋮ | ⋮ | ⋮ | ⋮ |

FIG. 11

PRINT JOB — PJ2
- IMAGE DATA
- SHEET INFORAMTION SI (MANUFACTURER, PRODUCT NO.)

INPUT EVALUATION ☒

HOW WOULD YOU RATE PRINTING RESULTS?

DISSATISFIED    RB4      SATISFIED
BRIGHTNESS ◉1   ○2   ○3   ○4   ○5

SATURATION ◉1   ○2   ○3   ○4   ○5

HUE        ◉1   ○2   ○3   ○4   ○5

SEND — BT7

SERVER RECEIVING IMAGE DATA FROM TERMINAL DEVICE AND GENERATING PRINT DATA BASED ON IMAGE DATA

CROSS REFERENCE TO RELATED APPLICATION

This application claims priority from Japanese Patent Application No. 2014-133864 filed Jun. 30, 2014. The entire content of the priority application is incorporated herein by reference.

TECHNICAL FIELD

The present disclosure relates to a server connected to a network.

BACKGROUND

A system known in the art uses a server connected to a network, such as the Internet, to print a job. With this technology, a terminal device transmits image data to the server. The server generates print data based on this image data and sends the print data to the user's printer. The printer prints images on sheets based on the print data.

SUMMARY

However, the number of users with terminal devices capable of communicating with the server, through which the conventional system described above performs printing processes, could become extremely large, while the locations of these users could be spread over many regions. Since the printing sheets available to users in different regions can vary widely in type and quality, this type of system may not be able to perform printing operations best suited for the types of sheets.

In view of the forgoing, it is an object of the disclosure to provide a system that uses a server connected to a network to execute printing operations suited to the types of sheets being printed.

By implementing the present invention according to the following embodiment, the invention can resolve at least part of the conventional issues described above.

In order to attain the above and other objects, the disclosure provides a non-transitory computer-readable storage medium storing computer-readable instructions, when executed by a processor, causing a server connected to a network to perform: receiving at least one set of parameter-related data and at least one piece of sheet information from at least one first terminal device connected to the server via the network, the at least one piece of sheet information being indicative of one sheet; determining a printing parameter on a basis of the at least one set of parameter-related data received from the at least one first terminal device; registering, in a storage device, the printing parameter in association with registration-sheet information indicative of the one sheet indicated by the at least one piece of sheet information; transmitting, to a second terminal device connected to the server via the network, a list of sheets that is indicated by at least one piece of registration-sheet information registered in the storage device, each of the at least one piece of registration-sheet information being indicative of a sheet; receiving a print command from the second terminal device, the print command including: image data indicative of an image to be printed; and sheet-specifying data specifying a sheet that is selected from the list of sheets; generating print data by using: the image data included in the print command; and a printing parameter registered in association with target sheet information in the storage device, the target sheet information being registration-sheet information that is registered in the storage device and is indicative of the sheet specified by the sheet-specifying data, the print data being used for printing the image on the sheet specified by the sheet-specifying data; and transmitting the print data to a printing device connected to the server via the network.

According to another aspect, the disclosure provides a server connected to a network and including a processor and a memory storing computer-readable instructions therein. The computer-readable instructions, when executed by the processor, cause the server to perform: receiving at least one set of parameter-related data and at least one piece of sheet information from at least one first terminal device connected to the server via the network, the at least one piece of sheet information being indicative of one sheet; determining a printing parameter on a basis of the at least one set of parameter-related data received from the at least one first terminal device; registering, in a storage device, the printing parameter in association with registration-sheet information indicative of the one sheet indicated by the at least one piece of sheet information; transmitting, to a second terminal device connected to the server via the network, a list of sheets that is indicated by at least one piece of registration-sheet information registered in the storage device, each of the at least one piece of registration-sheet information being indicative of a sheet; receiving a print command from the second terminal device, the print command including: image data indicative of an image to be printed; and sheet-specifying data specifying a sheet that is selected from the list of sheets; generating print data by using: the image data included in the print command; and a printing parameter registered in association with target sheet information in the storage device, the target sheet information being registration-sheet information that is registered in the storage device and is indicative of the sheet specified by the sheet-specifying data, the print data being used for printing the image on the sheet specified by the sheet-specifying data; and transmitting the print data to a printing device connected to the server via the network.

According to another aspect, the disclosure provides a method executed by a server connected to a network. The method includes: receiving at least one set of parameter-related data and at least one piece of sheet information from at least one first terminal device connected to the server via the network, the at least one piece of sheet information being indicative of one sheet; determining a printing parameter on a basis of the at least one set of parameter-related data received from the at least one first terminal device; registering, in a storage device, the printing parameter in association with registration-sheet information indicative of the one sheet indicated by the at least one piece of sheet information; transmitting, to a second terminal device connected to the server via the network, a list of sheets that is indicated by at least one piece of registration-sheet information registered in the storage device, each of the at least one piece of registration-sheet information being indicative of a sheet; receiving a print command from the second terminal device, the print command including: image data indicative of an image to be printed; and sheet-specifying data specifying a sheet that is selected from the list of sheets; generating print data by using: the image data included in the print command; and a printing parameter registered in association with target sheet information in the storage device, the target sheet information being registration-sheet information that is registered in the storage device and is indicative of the sheet specified by the sheet-specifying data, the print data being used for printing the image on the sheet specified by the sheet-specifying data; and transmitting the print data to a printing device connected to the server via the network.

BRIEF DESCRIPTION OF THE DRAWINGS

The particular features and advantages of the disclosure as well as other objects will become apparent from the following description taken in connection with the accompanying drawings, in which:

FIG. 2 shows an example of a main table;

FIG. 3 shows a sequence of operations in a manual configuration mode;

FIG. 9 shows an example of a registration table;

FIG. 11 shows an example of a print job generated when the automatic configuration mode is selected;

FIG. 12 shows an example of a fourth UI window; and

DETAILED DESCRIPTION

A. Embodiment

A-1. Structure of a Printing System

Figure 1:
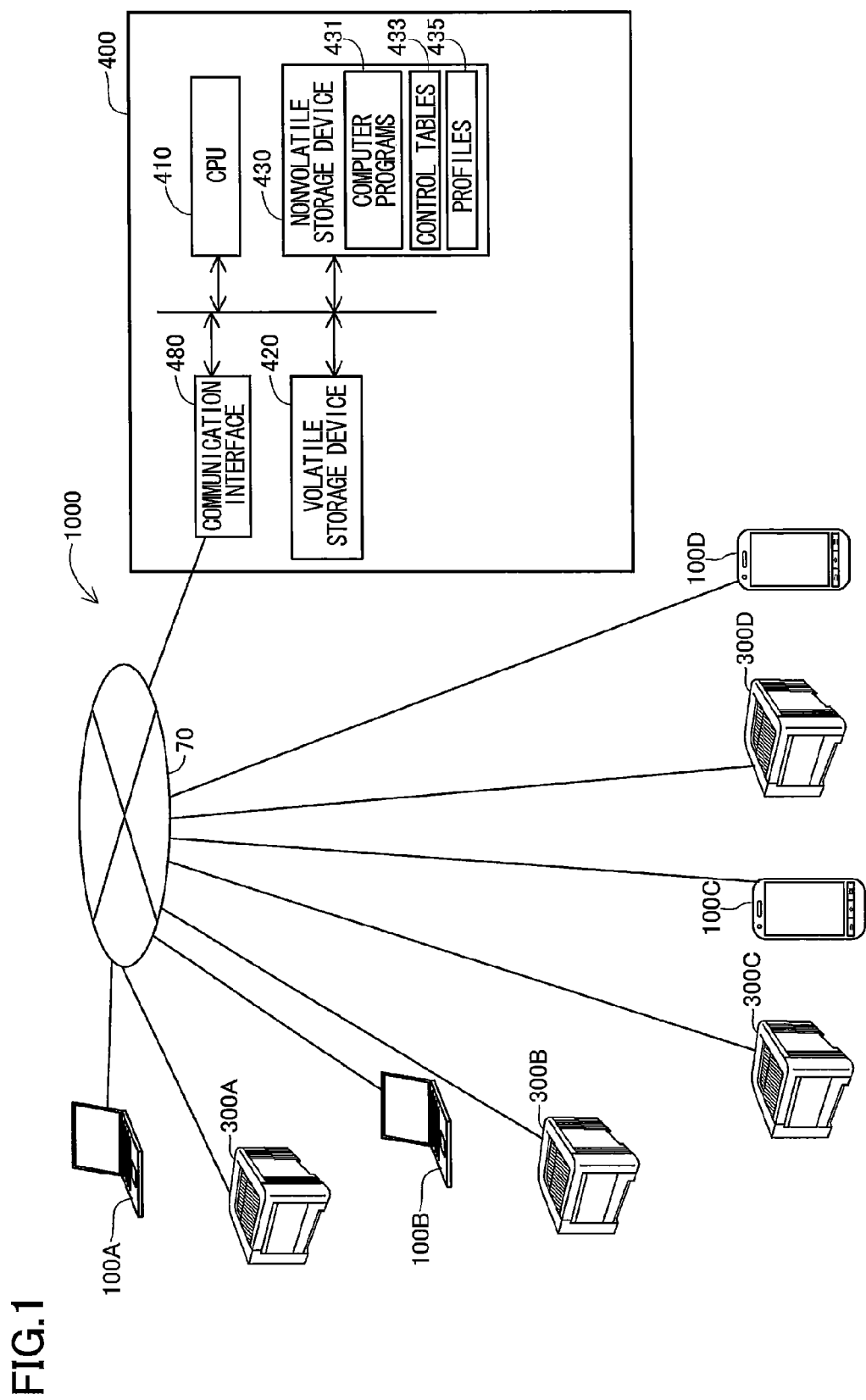
FIG. 1 is an explanatory diagram showing a printing system including a server according to an embodiment.

FIG. 1 is an explanatory diagram showing a printing system 1000 according to an embodiment. The printing system 1000 includes terminal devices 100A-100D, such as personal computers and portable terminals; printers 300A-300D that print images using ink in the four colors cyan, magenta, yellow, and black (CMYK) as printing material; and a server 400. The terminal devices 100A-100D, printers 300A-300D, and server 400 are connected to an internet 70 via a wired communication technology, such as Ethernet (registered trademark), a wireless communication technology, such as Wi-Fi or Long-Term Evolution (LTE).

In this example, the printer 300A is used by the user of the terminal device 100A. Similarly, the printers 300B, 300C, and 300D are respectively used by the users of the terminal devices 100B, 100C, and 100D.

The server 400 includes a CPU 410 serving as an example of a processor and controller for controlling the server 400, a volatile storage device 420, such as DRAM; a nonvolatile storage device 430, such as a hard disk; and a communication interface 480 (for example, a wired communication interface conforming to the IEEE 802.3 standard) connected to the internet 70 for communicating with other devices. The nonvolatile storage device 430 stores computer programs 431 serving as example of computer-readable instructions, control tables 433, and profiles 435.

The computer programs 431 are supplied on a CD-ROM or other storage medium, or are downloaded from a computer, such as another server, via the internet 70. The communication interface 480 is connected to the internet 70.

The CPU 410 executes the computer programs 431 using the volatile storage device 420 and nonvolatile storage device 430 in order to provide a printing service to clients, such as the terminal devices 100A-100D, via a network, such as the internet 70. This printing service will be described later.

The control tables 433 includes a main table MT, record tables (described later), and registration tables (described later). FIG. 2 shows an example of the main table MT. The main table MT stores, for each of a plurality of regions, one or more sets of sheet information SI specifying information for one or more printing sheets used in that region. Thus, the main table MT includes regional information RI specifying regions, and sheet information SI for one or more sheets recorded in association with the regional information RI. The regional information RI specifies countries, such as Japan, China, and the U.S. in this example. However, the regional information RI may also specify larger regions, such as East Asia, Southeast Asia, North America, and the like, or may specify smaller regions, such as prefectures, states, and the like. Each entry of sheet information SI provides information for one type of sheet and includes data specifying the manufacturer's name and data specifying the product number, for example.

The main table MT in this example also records a record table and a registration table in association with each entry of sheet information SI. In the example of FIG. 2, a record table R11 and a registration table G11 are associated with a sheet having product number ST0001 manufactured by Company A, and a record table R21 and a registration table G21 are associated with a sheet having product number ES0001 manufactured by Company E.

The profiles 435 include a plurality of profiles used for generating print data, and specifically include brightness correction profiles and color conversion profiles CP1-CP6 described later.

A-2. Operations of the Printing System

A-2-1. Preparation

In order to use the printing service provided by the server 400, users of the terminal devices 100A-100D must first acquire an account for using the printing service by registering account information on the server 400, such as a username and password. After acquiring an account, the user registers a printer on the server 400 as the printer that will perform printing operations using the printing service of the server 400. In this example, the user of the terminal device 100A uses an online service provided by the server 400 to register a printer, and the account information of the user and ID data for the printer 300A are registered in association with each other on the server 400.

After obtaining an account, the user can perform further registration procedures to provide parameter-related data (described later) to the server 400. Hereinafter, users with account that have registered to provide parameter-related data will be called "collaborative users," while users that have not registered to provide parameter-related data will be called "general users." In this example, the users of the terminal devices 100A and 100B are collaborative users, while the users of the terminal devices 100C and 100D are general users.

A-2-2. Manual Configuration Mode

The printing service provided by the server 400 has two modes of operation: a manual configuration mode, and an automatic configuration mode. Operations in the manual configuration mode will be described first.

FIG. 3 shows the sequence of operations in the manual configuration mode. In the example of FIG. 3, the user of the terminal device 100A is using the printing service provided by the server 400 in order to print a job on the printer 300A. The terminal device 100A and server 400 communicate with each other according to the Hypertext Transfer Protocol (HTTP). Thus, when the terminal device 100A transmits data to the server 400, for example, a web browser running on the terminal device 100A transmits the data as an HTTP request. Immediately after receiving the HTTP request from the terminal device 100A, the server 400 transmits data to the terminal device 100A as an HTTP response.

In S5 of FIG. 3, the terminal device 100A transmits a start request to the server 400 for starting the printing service. Specifically, the terminal device 100A accesses a login page for the printing service using a web browser in response to operations performed by the user. The start request that the terminal device 100A transmits to the server 400 includes user account data that the user inputs in a login operation.

In S7 the CPU 410 of the server 400 identifies the region in which the terminal device 100A is located based on information included in the start request. In the example of the embodiment, the user's address is registered in association with the account data in the start request. The CPU 410 identifies the user's address based on the account data, and identifies the region in which the terminal device 100A is located based on this address. Alternatively, the CPU 410 of the server 400 may identify the region in which the terminal device 100A is located based on the IP address of the terminal device 100A included in the start request as source IP Address data, for example. Web services capable of identifying the regional location of a terminal device based on its IP address are known in the art.

In S10 the CPU 410 transmits image data to the terminal device 100A representing a user interface window (hereinafter called a UI window) for the printing service.

Figure 4A:
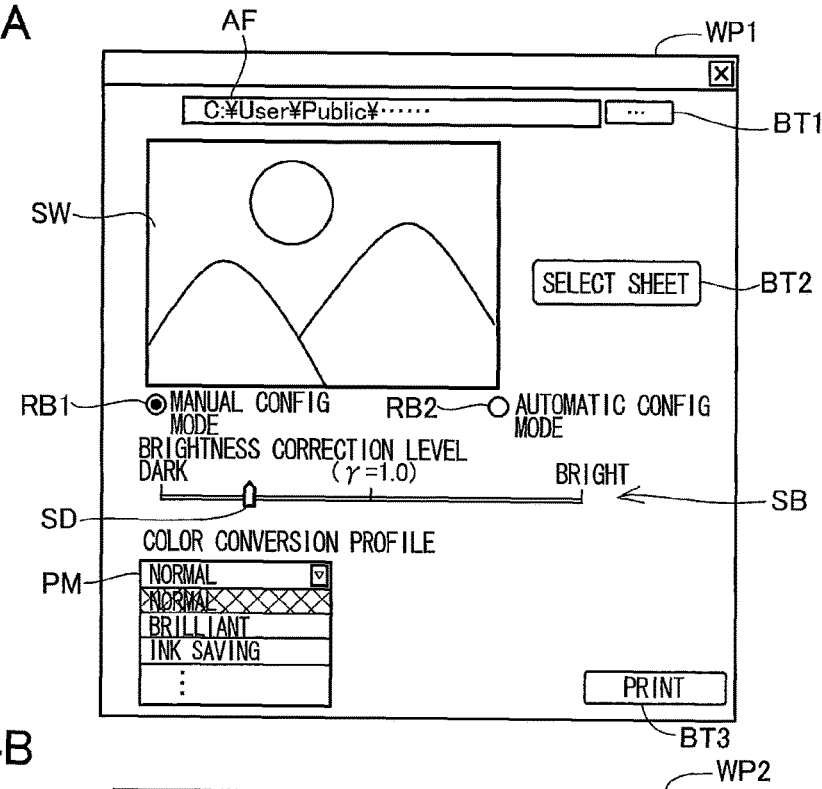
FIG. 4A shows an example of a first UI window.
Figure 4B:
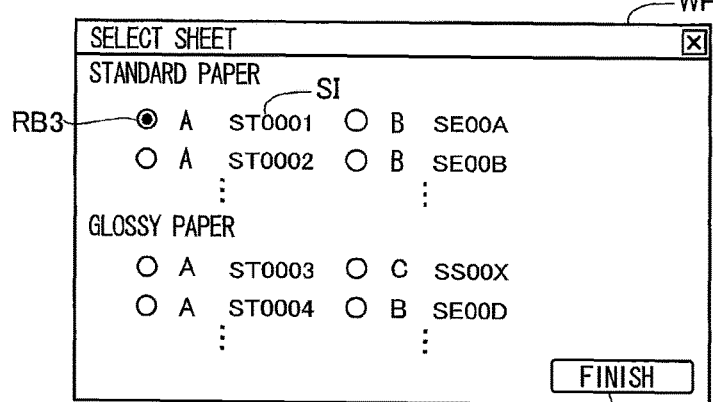
FIG. 4B shows an example of a second UI window.
Figure 4C:
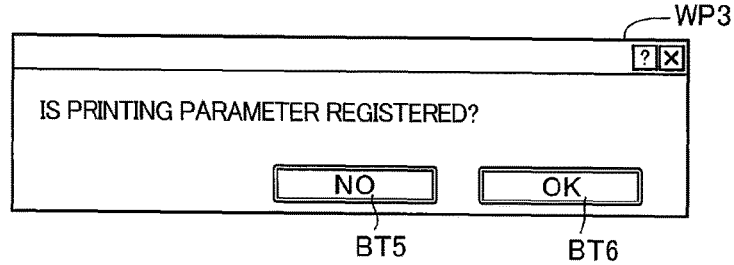
FIG. 4C shows an example of a third UI window.

FIG. 4 shows an example of this UI window. The image data transmitted in S10 includes first window data representing a first UI window WP1 shown in FIG. 4A, and second window data representing a second UI window WP2 shown in FIG. 4B. As will be described later in greater detail, the first window data is the same for each region, while the second window data includes a list of recording sheets that differ from region to region. Thus, the second window data includes a list of sheets that is generated by referencing the sheet information SI registered and recorded for each region in the main table MT based on the region identified in S7.

In S15 the terminal device 100A displays the first UI window WP1 of FIG. 4A (and the second UI window WP2 of FIG. 4B if a button BT2 described later is selected) on a display unit of the terminal device 100A based on the window data received from the server 400, and accepts print settings from the user via the first UI window WP1 and the second UI window WP2.

The first UI window WP1 includes buttons BT1-BT3, a path field AF, a selection window SW, radio buttons RB1 and RB2, a slide bar SB, and a pull-down menu PM.

The button BT1 is a button enabling the user to specify target image data representing a desired image to be printed. The button BT2 is a button for displaying the second UI window WP2 through which the user can select a specific type of sheet to be used for printing. The button BT3 is a button for initiating printing of the desired image.

More specifically, when the user clicks the button BT1, the terminal device 100A displays a selection window (not shown) including image data (files) for one or more images stored in a storage device of the terminal device 100A for the user to select. Once the user selects desired image data from the selection window, the pathname of the target image data is displayed in the path field AF and a preview image for the image represented by the target image data is displayed in the selection window SW.

When the user clicks the button BT2, the second UI window WP2 shown in FIG. 4B is displayed on the display unit of the terminal device 100A. The second UI window WP2 includes the sheet information SI for the plurality of sheet types specified in the list, a plurality of radio buttons RB3 corresponding respectively to the plurality of sheet types, and a finish button BT4. The user selects a type of sheet to be used in printing by clicking the radio button RB3 next to the desired sheet type and clicking the finish button BT4.

Returning to FIG. 4A, the user can also switch the operating mode between the manual configuration mode and automatic configuration mode by selecting the appropriate radio button RB1 or RB2. By selecting the manual configuration mode, the user can select the target image data and sheet type, as described above, and can also specify a brightness correction level and select a color conversion profile. When the automatic configuration mode has been selected, the user can select the target image data and sheet type, as described above, but cannot set specify a brightness correction level nor select a color conversion profile. The following description will be continued as if the manual configuration mode has been selected.

When the manual configuration mode has been selected, the user can use the slide bar SB to set a desired brightness correction level CL. Note that input from the slide bar SB is not valid when the automatic configuration mode has been selected.

Figures 5, 6, 7:
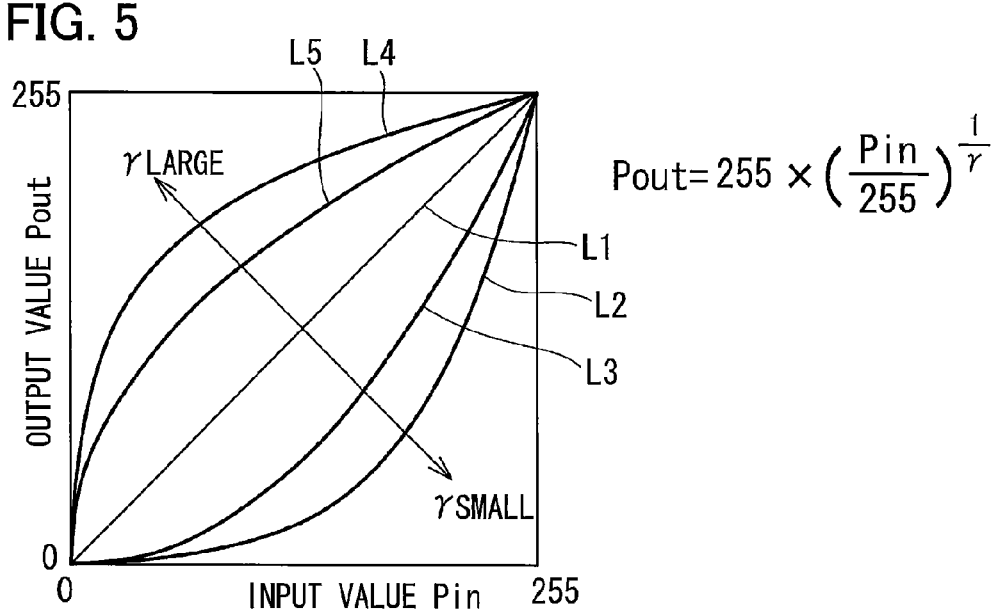
FIG. 5 shows an example of a graph of brightness correction profile.
FIG. 6 shows an example of a print job generated when the manual configuration mode is selected.
FIG. 7 shows an example of a record table.

FIG. 5 is a graph of a brightness correction profile. The brightness correction profile in FIG. 5 is a one-dimensional look-up table that correlates input values $P_{in}$ with output values $P_{out}$ for tone curves. These tone curves are expressed with an equation in FIG. 5 when input values $P_{in}$ are values for 256 gradations in the range 0-255. The gamma ($\gamma$) value is set to 1 when not changing brightness between the input and output values. The $\gamma$ value is set greater than 1 when increasing brightness, with a larger $\gamma$ value producing greater brightness. Conversely, the $\gamma$ value is set in the range $0<\gamma<1$ when reducing brightness, with a smaller $\gamma$ value producing a lower brightness. The tone curve L1 is the curve produced when $\gamma=1$. Tone curves L2 and L3 are produced when $0<\gamma<1$, and tone curves L4 and L5 are produced when $\gamma>1$.

The brightness correction level CL may be expressed as any of 256 gradations between 0 and 255. When CL=0, for example, $\gamma=0$, i.e., all input values input value $P_{in}$ are made darker down to the minimum value 0. When CL=128, $\gamma=1$, i.e., brightness is not corrected. When CL=255, $\gamma=\infty$, i.e., all input values input values $P_{in}$ are made brighter to the maximum value 255. The user can input a desired brightness correction level CL by moving the position of a slider SD on the slide bar SB (see FIG. 4A). The leftmost position on the slide bar SB corresponds to CL=0, the middle position corresponds to CL=128, and the rightmost position corresponds to CL=255.

Through the pull-down menu PM of the first UI window WP1, the user can select a desired color conversion profile CP to be used for generating print data. The color conversion profile CP converts color values in the RGB color space (hereinafter called RGB values) to color values in the CMYK color space (hereinafter called CMYK values). More specifically, the color conversion profile CP defines correlations between a plurality of RGB values and a plurality of CMYK values. All of the RGB and CMYK component values in the embodiment are given as one of 256 gradations between values 0 and 255. In the embodiment, the user selects one of six color conversion profiles CP1-CP6 that differ from each other in such aspects as their representable color gamut, quantity of ink per unit area used in printing, and density at which black ink begins to be introduced (otherwise known as the "black start point"). Names may be assigned to these color conversion profiles CP1-CP6 to indicate their characteristics (for example, normal, bright, or reduced ink). By selecting a name in the pull-down menu PM, the user can select a desired color conversion profile CP to be used for generating print data.

When the user has clicked on the button BT3, the terminal device 100A receives all print settings as they are currently set in the UI windows WP1 and WP2.

In S20 of FIG. 3, the terminal device 100A generates a print job PJ1 and transmits the print job PJ1 to the server 400.

FIG. 6 shows an example of a print job PJ1. The print job PJ1 includes the target image data that was selected in the first UI window WP1, the sheet information SI selected in the second UI window WP2 for specifying the desired sheet, the value of the brightness correction level CL set in the first UI window WP1, and data specifying the color conversion profile selected in the first UI window WP1. The value of the brightness correction level CL and the data specifying the color conversion profile CP can be considered printing parameters that will be used to generate print data. Accordingly, this data will be called parameter-related data.

Upon receiving the print job PJ1, in S25 the CPU 410 of the server 400 generates print data based on the print job PJ1. More specifically, the CPU 410 rasterizes the target image data included in the print job PJ1 to generate RGB image data representing the target image. The RGB image data is bitmap data expressing the color for each pixel in RGB values. The CPU 410 executes brightness correction on the RGB image data to generate corrected RGB image data. Brightness correction is a process for correcting each RGB component value by applying a brightness correction profile corresponding to the brightness correction level CL specified in data included in the print job PJ1. The CPU 410 then executes a color conversion process on the corrected RGB image data to generate CMYK image data. This CMYK image data is bitmap data representing the color of each pixel in CMYK values. The color conversion process is executed using the color conversion profile CP set according to data included in the print job PJ1. The CPU 410 then executes a halftone process, such as an error diffusion process, on the CMYK image data to generate print data that indicates the dot formation state for each pixel. The dot formation data includes at least dot ON/OFF data (data indicating whether a dot is to be formed) for each pixel, and may also include the size of the dot to be formed (large, medium, or small, for example).

In S30 the CPU 410 sends the generated print data to the registered printer 300A. The printer 300A maintains a communication connection with the server 400 by periodically transmitting a request to the server 400 while the power to the printer 300A remains on, for example. Thus, the CPU 410 transmits this print data using the established communication connection. A well-known protocol, such as Extensible Messaging and Presence Protocol (XMPP), may be used to maintain this communication connection.

After receiving the print data, in S35 the printer 300A prints a target image based on the print data. More specifically, if the user of the terminal device 100A has set sheets of the type selected via the second UI window WP2 in a sheet tray of the printer 300A, the printer 300A prints the target image on these sheets.

After transmitting the print data to the printer 300A, in S40 the CPU 410 determines whether the user of the terminal device 100A, i.e., the source of the print job, is a collaborative user. That is, the CPU 410 determines whether the user has indicated a desire to provide parameter-related data specifying the brightness correction level CL and color conversion profile CP used for printing. The CPU 410 can make this determination since data indicating whether each user is a collaborative user has been recorded on the server 400 as described above.

The CPU 410 ends the process if the user of the terminal device 100A is not a collaborative user (S40: NO). However, if the user of the terminal device 100A is a collaborative user (S40: YES), in S45 the CPU 410 transmits third UI image data representing a third UI window WP3 shown in FIG. 4C to the terminal device 100A.

The third UI window WP3 prompts the user to indicate whether the user would like the parameter-related data included in the print job to be recorded on the server 400. The third UI window WP3 includes buttons BT5 and BT6 for inputting a desire to record or not record the parameter-related data.

In S50 the terminal device 100A displays the third UI window WP3 on the display unit of the terminal device 100A using the third UI window data received from the server 400 and accepts user input indicating whether to record or not record the parameter-related data. Here, the user may allow the parameter-related data to be recorded on the server 400 after determining that the actual quality of the target image printed on the printer 300A is satisfactory and that it is worthwhile to record the parameter-related data for this print job, for example. On the other hand, the user may decide not to allow the parameter-related data to be recorded on the server 400 after determining that the printed image quality is unsatisfactory and that there is no value to recording the parameter-related data. In S55 the terminal device 100A transmits the data received from the user indicating whether or not to record the parameter-related data to the server 400.

In S60 the CPU 410 of the server 400 determines whether the data received from the terminal device 100A indicates that the user has allowed the parameter-related data to be recorded. If the data does not indicate that the user has allowed recording of the parameter-related data (S60: NO), the CPU 410 ends the current process. However, if the data indicates that the user has allowed recording of the parameter-related data (S60: YES), in S65 the CPU 410 records in a record table shown in FIG. 2 the parameter-related data from the print job PJ1, i.e., the value of the brightness correction level CL and data indicating the type of the color conversion profile CP, and subsequently ends the current process.

FIG. 7 shows an example of a record table. The nonvolatile storage device 430 of the server 400 stores record tables of the same number as the number of sheet information SI entries (serving as example of registration-sheet information) in the main table MT, as shown in FIG. 2. Record table R11 in FIG. 7 is just one of the plurality of record tables. As shown in FIG. 7, record table R11 includes a plurality of entries of parameter-related data. In S65, the CPU 410 first searches the main table MT for the regional information RI indicating the region identified in S7 at which the terminal device 100A is located. Next, the CPU 410 searches the one or more entries of sheet information SI recorded in association with the regional information RI for the sheet information SI included in the print job PJ1. The CPU 410 records the parameter-related data from the print job PJ1 in the record table associated with the sheet information SI entry found above. In this way, collaborative users can accumulate usage history on the server 400 for individual types of sheets indicating the combination of the brightness correction level CL and the color conversion profile used in actual print jobs.

A-2-3. Printing Parameter Registration Process

The CPU 410 of the server 400 executes a printing parameter registration process. The printing parameter registration process is executed when a prescribed condition has been met, and functions to set printing parameters using the plurality of parameter-related data recorded in the record table of FIG. 7 at that time and to register the printing parameters.

Figure 8:
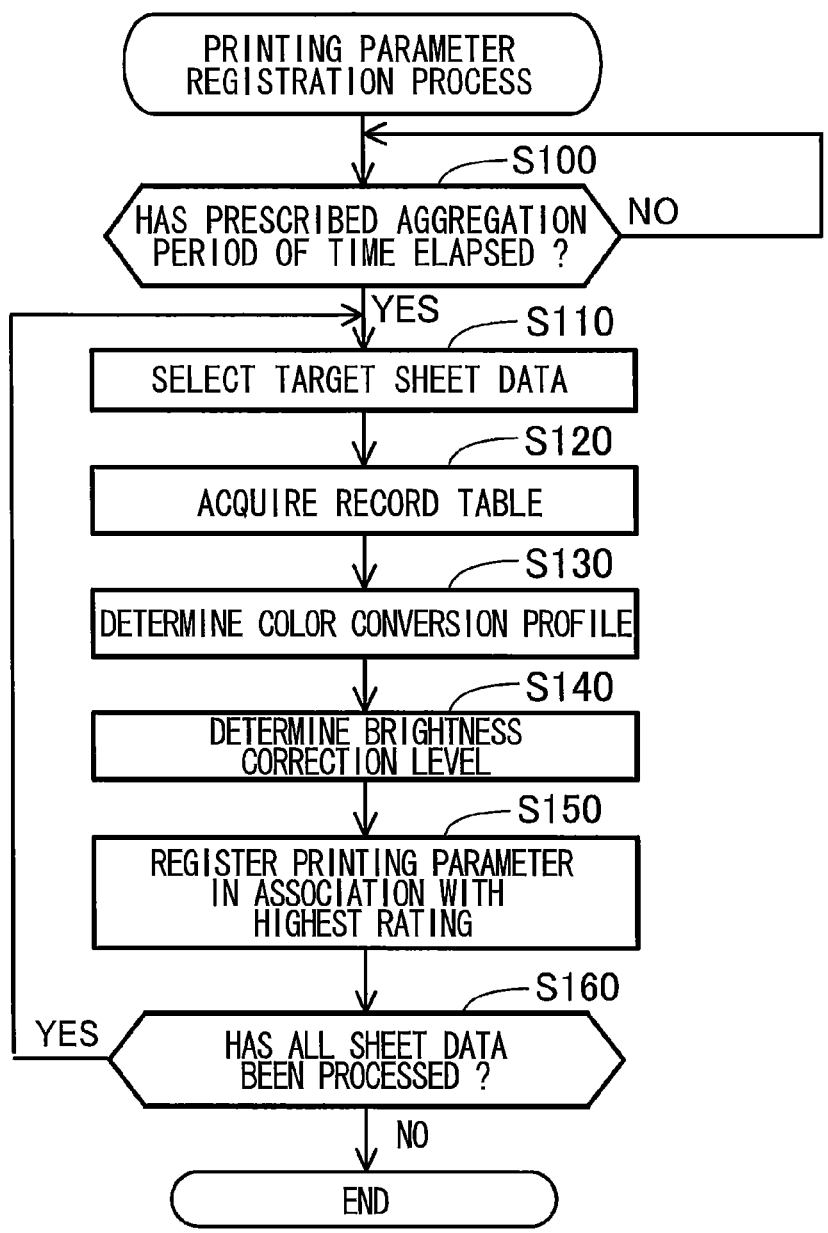
FIG. 8 is a flowchart showing steps in a printing parameter registration process executed by the server.

FIG. 8 is a flowchart showing steps in the printing parameter registration process. In S100 of FIG. 8, the CPU 410 determines whether a prescribed aggregation period of time, such as six months or one year, has elapsed since printing parameters were previously registered. If the prescribed aggregation period of time has not elapsed (S100: NO), the CPU 410 waits until the prescribed aggregation period of time has elapsed. When the prescribed aggregation of time has elapsed (S100: YES), in S110 the CPU 410 selects one entry of sheet data from the plurality of entries of sheet information SI recorded in the main table MT as subject sheet data.

In S120 the CPU 410 acquires the record table associated with the subject sheet data from the nonvolatile storage device 430 as the target record table and stores this target record table in the volatile storage device 420.

In S130 the CPU 410 selects the color conversion profile CP to be registered. Specifically, the CPU 410 selects the color conversion profile CP from among the six color conversion profiles CP1-CP6 that is recorded most in the target record table as the color conversion profile CP to be registered.

In S140 the CPU 410 determines the brightness correction level CL to be registered. Since the brightness correction profile is determined based on the value of the brightness correction level CL, setting the brightness correction level CL is tantamount to setting the brightness correction profile. Specifically, the CPU 410 extracts one or more records of parameter-related data that include the color conversion profile CP set in S130 to be registered from among the plurality of sets of parameter-related data recorded in the target record table. Next, the CPU 410 sets the brightness correction level CL to be registered to the average value of the one or more brightness correction levels CL included in the one or more extracted sets of parameter-related data.

In S150 the CPU 410 registers the printing parameters set above, including data indicating the type of color conversion profile CP that was set in S130 and the brightness correction level CL that was set in S140, in a registration table shown in FIG. 2. Here, the combination of the brightness correction profile and color conversion profile CP registered in the registration table are to be used in the automatic configuration mode described later.

FIG. 9 shows an example of a registration table. The nonvolatile storage device 430 of the server 400 stores registration tables of a number identical to the number of entries of sheet information SI in the main table MT shown in FIG. 2. The registration table G11 in FIG. 9 is one of these registration tables. As shown in FIG. 9, a plurality of printing parameters can be registered in the registration table G11. A rating value (serving as an example of evaluation value) and an aggregation table described later are associated with each set of registered printing parameters.

In S150 the CPU 410 registers the printing parameters determined above in the registration table associated with the subject sheet data. Note that the maximum rating value is set in association with newly registered printing parameters. The maximum rating value is 15 points in the embodiment. By associating the maximum rating value with newly registered printing parameters, those printing parameters are guaranteed to be used at least once in the generation of print data in the automatic configuration mode described later.

In S160 the CPU 410 determines whether all entries of sheet information SI in the main table MT have been processed. If there remain unprocessed entries (S160: NO), the CPU 410 returns to S110 and selects an unprocessed entry of sheet information SI to be the subject sheet data. When all records of sheet information SI have been processed (S160: YES), the CPU 410 ends the printing parameter registration process.

In the printing parameter registration process described above, just one set of printing parameters is registered in each registration table every time the aggregation period of time has elapsed. Hence, each time the aggregation period of time elapses, the number of registered sets of printing parameters for each entry of sheet information SI recorded in the main table MT increases by 1.

A-2-4. Automatic Configuration Mode

Figure 10:
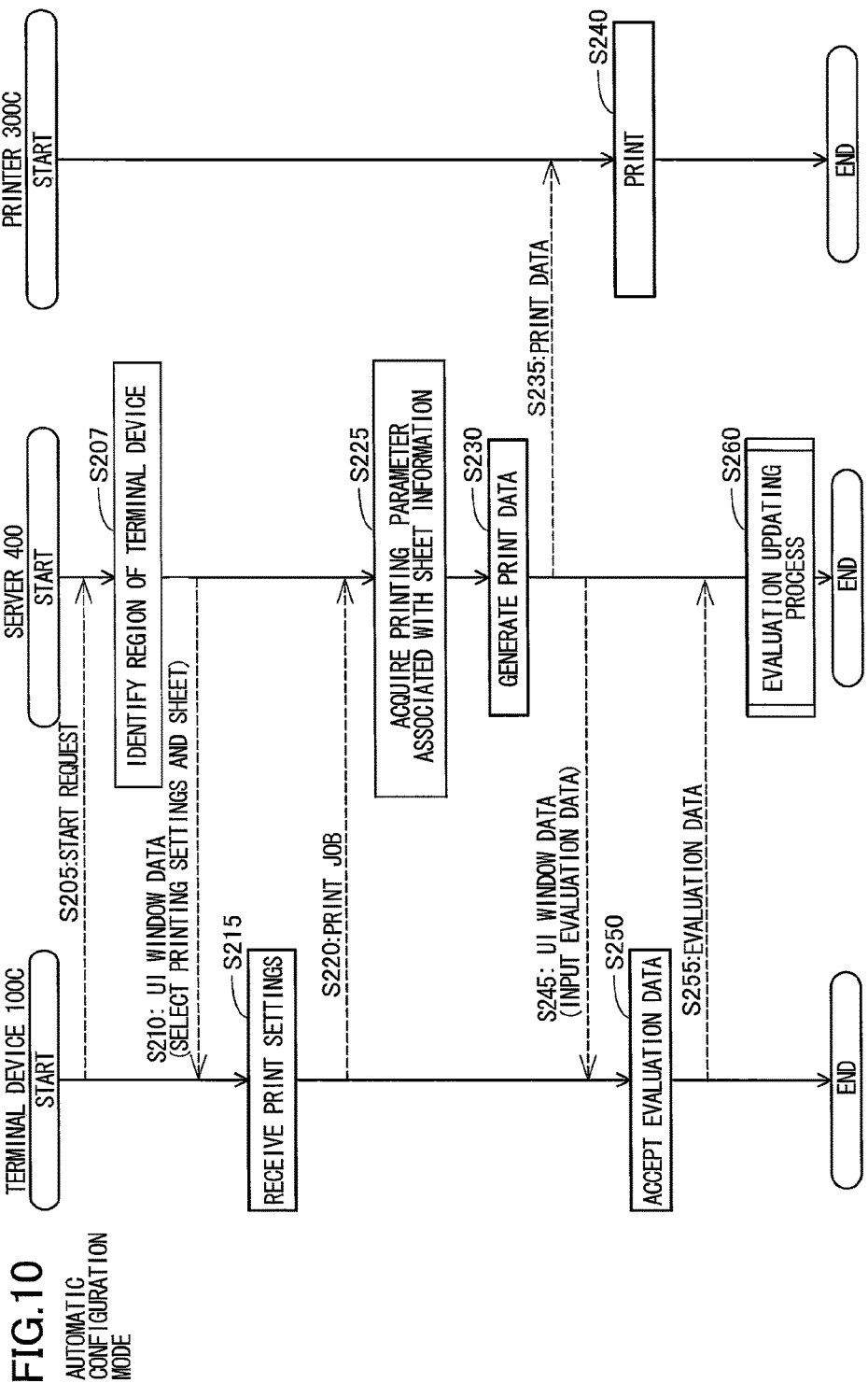
FIG. 10 shows a sequence of operations in an automatic configuration mode.

Next, operations performed in the automatic configuration mode will be described for the printing service provided by the server 400. FIG. 10 shows the sequence of operations in the automatic configuration mode. The automatic configuration mode can be implemented when at least one set of printing parameters has been registered in the registration table associated with each entry of sheet information SI recorded in the main table MT. In the example of FIG. 10, the user of the terminal device 100C is using the printing service provided by the server 400 to execute a print job on the printer 300C. As with the manual configuration mode, communications between the terminal device 100C and the server 400 in the automatic configuration mode are implemented using HTTP.

As in S5 of FIG. 3, in S205 of FIG. 10 the terminal device 100C transmits a start request to the server 400. As in S7 and S10 of FIG. 3, in S207 the CPU 410 identifies the region in which the terminal device 100C is located and in S210 transmits image data to the terminal device 100C that includes a list of sheets that is indicated by sheet information that has been registered in association with the region in which the terminal device 100C is located.

In S215 the terminal device 100C displays the first UI window WP1 of FIG. 4A (and the second UI window WP2 of FIG. 4B if the button BT2 is selected) on a display unit of the terminal device 100C based on the UI window data received from the server 400, and accepts print settings from the user.

The following description will assume that the radio button RB2 is on, indicating that the automatic configuration mode has been selected. In this case, the user can only select the target image data and the sheet type, as described above, since there is no need for the user to set the brightness correction level CL or select the color conversion profile CP.

In S220 the terminal device 100C generates a print job PJ2 and transmits the print job PJ2 to the server 400.

FIG. 11 shows an example of the print job PJ2 serving as an example of a print command. The print job PJ2 includes the target image data that was selected in the first UI window WP1, and the sheet information SI specifying the sheet that was selected in the second UI window WP2. Unlike the print job PJ1, the print job PJ2 does not include parameter-related data, such as the brightness correction level CL and color conversion profile CP. The sheet information SI included in the print job PJ2 may be called sheet-specifying data since it specifies the printing sheet on which the target image is to be printed.

Upon receiving the print job PJ2, in S225 the CPU 410 acquires the printing parameters associated with target sheet information SI indicative of a sheet specified by the sheet-specifying data included in the print job PJ2. That is, the CPU 410 can recognize that the automatic configuration mode has been selected since the print job PJ2 does not include the value of the brightness correction level CL and data indicating the type of the color conversion profile CP. Therefore, the CPU 410 automatically sets the brightness correction level CL and color conversion profile CP to be used. More specifically, the CPU 410 searches the regional information RI listed in the main table MT of FIG. 2 for the regional information RI of the region identified in S207 as the region in which the terminal device 100C is located. Next, the CPU 410 searches the sheet information SI associated with the searched regional information RI for the sheet information SI included in the print job PJ2. The CPU 410 then acquires the registration table (see FIG. 9) associated with this sheet information SI. Lastly, the CPU 410 searches the one or more sets of printing parameters registered in the registration table of FIG. 9 for a set of printing parameters with the highest rating value, and selects this set of printing parameters as the printing parameters to be used for printing.

In S230 the CPU 410 generates print data using the printing parameters acquired above. More specifically, the CPU 410 rasterizes the target image data included in the print job PJ2 to generate RGB image data representing the target image. The CPU 410 executes brightness correction on the RGB image data to generate corrected RGB image data. Brightness correction is executed by applying the brightness correction level CL (i.e., brightness correction profile) provided as one of the printing parameters acquired in S225. The CPU 410 then executes a color conversion process on the corrected RGB image data to generate CMYK image data. The color conversion process is executed using the color conversion profile CP, which is one of the printing parameters acquired in S225. The CPU 410 then executes a halftone process, such as an error diffusion process, on the CMYK image data to generate print data.

In S235 the CPU 410 transmits the generated print data to the registered printer 300C. Upon receiving the print data, in S240 the printer 300C prints a target image based on the print data. More specifically, if the user of the terminal device 100C has set sheets of the type selected via the second UI window WP2 in a sheet tray of the printer 300C, the printer 300C prints the target image on these sheets.

After transmitting the print data to the printer 300C, in S245 the CPU 410 transmits fourth UI window data representing a fourth UI window WP4 to the terminal device 100C. The fourth UI data serve as screen data.

FIG. 12 shows an example of the fourth UI window WP4. The fourth UI window WP4 is a UI window that enables the user to input an evaluation for the printing results obtained using the print data transmitted to the terminal device 100C in S245, and that transmits this evaluation to the server 400. Specifically, the fourth UI window WP4 includes a plurality of radio buttons RB4 for inputting a rating between 1 and 5 for each of the evaluation categories brightness, saturation, and hue; and a send button BT7 by which the user can transmit the evaluation.

In S250 the terminal device 100C displays the fourth UI window WP4 on the display unit of the terminal device 100C using the fourth UI window data received from the server 400 and accepts an evaluation of the printing results from the user. The user evaluates the quality of the actual target image printed using the printer 300C and inputs ratings for the printed image. In S255 the terminal device 100C transmits evaluation data to the server 400 indicating the user's ratings for the printed image. In other words, the sever 400 receives the evaluation data from the terminal device 100C.

In S260 the CPU 410 of the server 400 executes an evaluation updating process using the evaluation data received from the terminal device 100C to update the rating value associated with the printing parameters used to generate the print data in S230.

Figure 13:
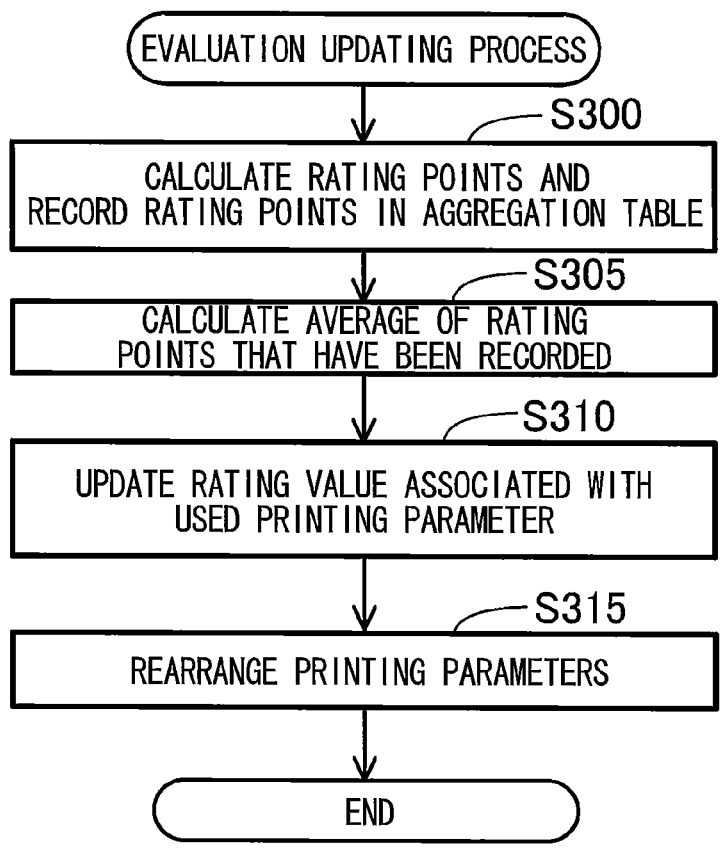
FIG. 13 is a flowchart illustrating steps in an evaluation updating process executed by the server.

FIG. 13 is a flowchart illustrating steps in the evaluation updating process. In S300 of FIG. 13, the CPU 410 calculates rating points based on the evaluation data received from the terminal device 100C and records the rating points in the aggregation table (see FIG. 9) associated with the printing parameters used to generate the print data in S230. In other words, the CPU 410 cumulatively records rating points in the aggregation table each time printing parameters associated with the table are used to generate print data. In the example of FIG. 12, rating points calculated in S300 fall within the range 5-15 points since each of the three evaluation criteria include evaluation points in the range 1-5. In this embodiment, the rating points is larger, the evaluation is higher.

In S305 the CPU 410 calculates the average value of the plurality of rating points recorded in the aggregation table, including the newly recorded rating points.

In S310 the CPU 410 updates, to the average value calculated in S305, the rating value recorded in the registration table in association with the printing parameters used to generate the print data in S230.

In S315 the CPU 410 rearranges the sets of printing parameters registered in the registration table in which the updated rating value is recorded based on their associated rating values in order from highest rating value to lowest. As a result, the set of printing parameters having the highest rating value will be positioned at the top of the registration table.

Through the evaluation updating process described above, printing parameters evaluated most highly by the user will be automatically used for generating print data. This method increases the possibility that suitable printing parameters will be used to generate print data.

After completing the evaluation updating process, the CPU 410 ends operations in the automatic configuration mode of FIG. 10.

According to the embodiment described above, in S20 of FIG. 3 the server 400 receives parameter-related data related to the printing parameters to be used in printing, and sheet information SI for the sheet to be used in printing from the terminal device 100A of a collaborative user (also known as a first terminal device or third terminal device). Thereafter, in the printing parameter registration process of FIG. 8 the server 400 uses the parameter-related data and sheet information SI received from the terminal device 100A of the collaborative user to register the sheet information SI and the printing parameters in association with each other in a registration table on the nonvolatile storage device 430. In S210 of FIG. 10, the server 400 transmits second UI window data to the terminal device 100C of a general user (also known as the second terminal device) that includes a list of sheets specified in the registered sheet information SI. In S220 of FIG. 10, the server 400 receives the print job PJ2 (see FIG. 11) from the terminal device 100C that includes target image data representing a target image, and sheet-specifying data specifying the sheet selected from the list. In S225 of FIG. 10, the server 400 generates print data using the target image data, and the printing parameters registered in association with the sheet information SI for the sheet specified by the sheet-specifying data. In S235 of FIG. 10, the server 400 transmits this print data to the printer 300C of the general user.

As a result, the server 400 can control the printer 300A to perform a printing operation suited to the specified sheet. To describe this in greater detail, sheets of printing paper used today come in a wide variety of types and qualities, each of which is suited to different printing parameters. For example, it may be desirable to use less ink per unit area when printing on sheets having lower ink absorbency than normal sheets to suppress ink running and overflow. Conversely, it may be preferable to use more ink per unit area when printing on sheets having higher ink absorbency than normal paper in order to expand the printable color gamut. Depending on the color of the sheet itself, it may be desirable to perform brightness correction to increase or decrease color brightness. Setting printing parameters specifying printing characteristics, i.e., setting the combination of a brightness correction profile and color conversion profile CP, may be too complex and burdensome for a general user with little knowledge of such matters. On the other hand, it could be difficult and burdensome on the operator of the printer to provide each user with suitable printing parameters for all sheets of paper in a timely manner. However, some users are relatively knowledgeable about printing parameters. In the embodiment, the server 400 collects parameter-related data from collaborative users capable of setting their own printing parameters to be used in printing operations. In other words, the collected parameter-related data was used for printing in the terminal devices of the collaborative users, such as the terminal device 100A. Using this parameter-related data collected from collaborative users, the server 400 can automatically record printing parameters for general users and can automatically use these printing parameters for general users executing printing operations. Consequently, this method can reduce the load on general users and printer operators and can enable general users to perform printing operations with suitable printing parameters.

In the embodiment described above, a rating value is associated with each set of printing parameters recorded in the registration table of FIG. 9. Thus, in S225 of FIG. 10, the CPU 410 acquires the printing parameters associated with the highest rating value to automatically generate print data. In other words, a first set of printing parameters associated with a first rating value and a second set of printing parameters associated with a second rating value can be recorded in association with a single sheet information SI entry. In this case, the server 400 generates print data using the first set of printing parameters when the sheet specified by sheet-specifying data in the print job PJ2 is the sheet specified by the relevant sheet information SI and the first rating value is higher than the second rating value. Similarly, the server 400 generates print data using the second set of printing parameters when the sheet specified by the sheet-specifying data in the print job PJ2 is a sheet associated with the relevant sheet information SI and the second rating value is higher than the first rating value. By generating print data using printing parameters with the higher rating among the first and second sets of printing parameters, the server 400 can automatically generate suitable print data using printing parameters suited to the specified sheet.

In the embodiment, upon receiving the print job PJ2 from the terminal device 100C in the automatic configuration mode, in S255 of FIG. 10 the server 400 receives evaluation data from the terminal device 100C indicating the user's evaluation of the printing results. Subsequently, the server 400 executes the evaluation updating process in S260 of FIG. 10. In other words, the server 400 uses the evaluation data acquired from the terminal device 100C to update the rating value associated with the set of printing parameters used for generating the print data (i.e., the first rating value associated with the first set of printing parameters or the second rating value associated with the second set of printing parameters). By updating the rating value based on the evaluation data received from the terminal device 100C, the server 400 can always generate print data using the most suitable printing parameters in the automatic configuration mode.

In the embodiment described above, in S245 of FIG. 10 the server 400 transmits the fourth UI window data to the terminal device 100C for returning the user's evaluation data to the server 400. As a result, the terminal device 100C can easily transmit evaluation data to the server 400 using the fourth UI window data. Further, the user of the terminal device 100C can easily input an evaluation for the printed image in the fourth UI window WP4 displayed based on the fourth UI window data.

When a plurality of collaborative users performs printing operations in the manual configuration mode of FIG. 3, the server 400 can receive a plurality of sets of parameter-related data and a plurality of piece of sheet information SI for each type of sheet from the terminal devices belonging to the plurality of collaborative users. In the printing parameter registration process of FIG. 8, the server 400 uses the plurality of sets of parameter-related data cumulatively recorded in the record tables to set printing parameters for registration. These printing parameters are recorded in the registration table associated with sheet information SI for a single type of sheet. By determining a single set of printing parameters to be registered using a plurality of sets of parameter-related data, the server 400 can register a more suitable set of printing parameters. If the server 400 were to set a single set of printing parameters based on the parameter-related data received from just one collaborative user, the probability of these printing parameters being suitable would not be sufficiently high. However, when setting a single set of printing parameters based on a plurality of sets of parameter-related data collected from a plurality of collaborative users, the server 400 can set suitable printing parameters with greater reliability.

Further, when a prescribed time period of time has elapsed after the server 400 registered one set of printing parameters in the printing parameter registration process of FIG. 8 (S100: YES), the server 400 repeats the process to set another set of printing parameters for each type of sheet. The server 400 registers sheet information SI specifying the sheet of a single relevant type in association with the newly set printing parameters. Accordingly, the server 400 can register new printing parameters at a suitable timing. In other words, even though the type of sheet may remain the same, the quality of the sheets may change over time, as might the tastes of the user. Therefore, it is desirable to regularly register new printing parameters. In the embodiment, new printing parameters are registered appropriate intervals.

As described above, the printing parameters registered in the registration table includes a preferred brightness correction profile and color conversion profile CP. Parameter-related data recorded in a record table includes data identifying the brightness correction profile and the color conversion profile CP, i.e., the value of the brightness correction level CL and data indicating the type of color conversion profile CP. Thus, in the printing parameter registration process of FIG. 8, the server 400 sets printing parameters to be registered by selecting a single brightness correction profile and a single color conversion profile (S130 and S140 of FIG. 8) based on the parameter-related data in the record table. Thereafter in the automatic configuration mode, the server 400 can generate suitable print data using a brightness correction profile and color conversion profile CP suited to the specified sheet type.

Further, in the printing parameter registration process of FIG. 8, the server 400 sets printing parameters for each region using parameter-related data recorded in association with the regional information RI. The server 400 then registers printing parameters in the registration table in association with the sheet information SI and regional information RI. Further, in S207 of FIG. 10, the server 400 identifies the region in which the terminal device 100C is located based on data received from the terminal device 100C, such as the data included in the print job PJ2. In S230 of FIG. 10, the server 400 generates print data using the printing parameters registered in association with the sheet information SI for the sheet specified by the sheet-specifying data, and the regional information RI indicating the region in which the terminal device 100C is located. Thus, even though sheet quality may vary according to region, such as country or locality, the server 400 can generate print data that is suitable for the specified sheet and the region in which the terminal device 100C is located.

B. Variations of the Embodiment (1) When the prescribed aggregation period of time has elapsed in the printing parameter registration process of FIG. 8, the server 400 registers new printing parameters. However, the server 400 may instead register new printing parameters when a prescribed number (100, for example) of sets of parameter-related data have been received for one sheet type. In this case, the CPU 410 may monitor each of the plurality of record tables corresponding to the plurality of entries of sheet information SI to determine whether any of the sets of parameter-related data not yet used for registering printing parameters has been recorded the prescribed number of times. When parameter-related data not yet used for registering printing parameters has been recorded the prescribed number of times in a record table, the CPU 410 may then use this parameter-related data to set new printing parameters. This method also enables the server 400 to register new printing parameters at a suitable timing.

(2) In the embodiment described above, parameter-related data is recorded and printing parameters are registered for each combination of regional information RI and sheet information SI, as shown in FIG. 2. However, categories other than the regional information RI and sheet information SI may be considered instead, such as the type of image being printed, the model of printer, printing resolution, and the like. For example, the server 400 may consider whether the type of image being printed is a photo image, a text image, or a graphic image. In this case, the server 400 would record parameter-related data and register printing parameters in correlation with the regional information RI, sheet information SI, and data indicating the type of image being printed. Then, when operating in the automatic configuration mode, the server 400 can execute printing operation using printing parameters suited to the type of image being printed. Image types may also be classified based on their subject matter, such as photos depicting people, photos depicting scenery, photos depicting night scenes, and the like.

(3) In the embodiment described above, the printing parameters include a brightness correction profile and a color conversion profile CP. However, the printing parameters may include other parameters in place of or in addition to these parameters. For example, printing parameters may include printing resolution. In this case, the server 400 records the value of the brightness correction level CL, data indicating the color conversion profile CP, and data indicating the printing resolution in a record table as the parameter-related data. Further, the server 400 registers the combination of brightness correction profile, color conversion profile, and printing resolution in a registration table as the printing parameters. With some sheets of recording paper, it may not be possible to obtain sufficient printing quality even when printing at an excessively high printing resolution, due to the occurrence of ink bleed and the like. Accordingly, a suitable printing resolution or a combination of a suitable resolution and other printing parameters may differ from sheet to sheet. With this variation of the embodiment, even a user with limited knowledge of printing parameters can print jobs on a printer at a printing resolution suited to the type of sheet.

(4) In the manual configuration mode of the embodiment described above, the user selects a desired sheet to be used for printing from a list displayed in the second UI window WP2 of FIG. 4B. However, the second UI window WP2 may instead include a text field for inputting sheet information, such as the manufacturer's name, product number, and the like. In this case, the user uses a text-inputting device such as a keyboard to input the sheet information, such as the manufacturer's name and product number. As a result, the server 400 can collect information for a sheet that the provider of the server 400 does not recognize and parameter-related data describing suitable printing parameters for that sheet. The server 400 records the collected sheet information in the main table MT, for example. Thus, the server 400 can more effectively collect information from collaborative users. Consequently, when operating in the automatic configuration mode, the server 400 can increase the number of types of sheets that a general user can select, without increasing the burden on the administrator of the server 400.

(5) The timing at which the server 400 transmits the third UI window data to the terminal device 100A in S45 of FIG. 3 prompting the user whether or not to record parameter-related data may be set after the printer 300A has completed printing the target image in S35. For example, the printer 300A may transmit a printing complete notification to the server 400 after completing the print job. After receiving this printing complete notification from the printer 300A, the server 400 may then transmit the third UI window data to the terminal device 100A. This method increases the probability that the collaborative user of the terminal device 100A will have actually seen the printed image and determined whether or not to record the parameter-related data. Therefore, the server 400 can more efficiently collect suitable parameter-related data that is worth recording.

(6) The timing at which the server 400 transmits the fourth UI window data to the terminal device 100C in S245 of FIG. 10 to acquire evaluation data for the printed image from the user of the terminal device 100C may be set after the printer 300A has completed printing the target image in S240. As in variation (5) described above, the server 400 may delay transmitting the fourth UI window data to the terminal device 100A until after a printing complete notification has been received from the printer 300C. This improves the probability that evaluation data is acquired after the general user of the terminal device 100C has actually seen the printed image. Therefore, the server 400 can more efficiently collect suitable evaluation data.

(7) In the embodiment described above, the server 400 records parameter-related data from the print job PJ1 received from the terminal device 100A in a record table when the user of the terminal device 100A using the printing service provided by the server 400 is a collaborative user. However, the server 400 may also obtain permission from a collaborative user to record, on either the terminal device 100A or the printer 300A, printing history for the collaborative user's use of the terminal device 100A and printer 300A unrelated to the printing service. This printing history includes parameter-related data specifying which printing parameters were used. Subsequently, the server 400 would receive the printing history from the terminal device 100A or printer 300A of the collaborative user to collect the parameter-related data.

(8) When operating in the automatic configuration mode of the embodiment, the server 400 automatically selects one set of printing parameters to be used for generating print data based on one entry of sheet information SI. However, the CPU 410 may instead present a prescribed number of sets of printing parameters to the user by transmitting prescribed UI window data to the user's terminal device. Thereafter, the server 400 generates print data using the printing parameters selected by the user from the plurality of choices. The prescribed number of sets of printing parameters may be selected from those sets having the highest rating values, for example, or alternatively may be selected in order of the printing parameters that were most recently registered. In the latter case, the server 400 may omit the process for receiving evaluation data from the terminal devices. Thus, printing parameters that are rarely selected by the user may be replaced with recently registered printing parameters.

(9) The color conversion profile CP in the embodiment is used to convert color values in the RGB color space to color values in the CMYK color space. However, the server 400 may employ color conversion profiles that convert color values in an arbitrary color space to color values in a color space having the three components C, M, and Y, or may employ color conversion profiles for converting color values in an arbitrary color space to color values in a color space having six components, including C, M, and Y, as well as light cyan (LC), light magenta (LM), and light yellow (LY). In general, any color conversion profile may be employed to convert color values of a first color space to color values of a second color space having color components corresponding to the printing colorants.

(10) If the server 400 is provided in each region corresponding to the regional information RI, for example, the server 400 may omit the process for collecting parameter-related data and recording printing parameters for each region in the regional information RI. In this case, terminal devices within a specific region are only allowed to access a server in the same region, for example.

(11) Instead of being connected to the internet 70, the server 400 may be a print server connected to a local area network (LAN) that has been installed at a corporation, school, or government agency and has a plurality of terminals with a plurality of users connected thereto.

(12) The server 400 may include a plurality of devices (computers, for example) that can communicate with each other over a network. Some of the processes executed by the server 400 may be implemented by each of the plurality of devices. In this case, the plurality of devices functions as a single server.

(13) Part of the configuration implemented in hardware in the embodiment described above may be replaced with software and, conversely, all or part of the configuration implemented in software may be replaced with hardware. For example, all or part of the processes executed by the server 400 may be implemented by dedicated hardware configured of logic circuits.

While the description has been made in detail with reference to specific embodiment and modifications thereof, it would be apparent to those skilled in the art that various changes and modifications may be made therein without departing from the spirit and scope of the above described aspects.

What is claimed is:

1. A non-transitory computer-readable storage medium storing computer-readable instructions, when executed by a processor, causing a server connected to a network to perform:
   receiving at least one set of parameter-related data and at least one piece of sheet information from at least one first terminal device connected to the server via the network, the at least one piece of sheet information being indicative of one sheet;
   determining a printing parameter on a basis of the at least one set of parameter-related data received from the at least one first terminal device;
   registering, in a storage device, the printing parameter in association with registration-sheet information indicative of the one sheet indicated by the at least one piece of sheet information;
   transmitting, to a second terminal device connected to the server via the network, a list of sheets that is indicated by at least one piece of registration-sheet information registered in the storage device, each of the at least one piece of registration-sheet information being indicative of a sheet, the second terminal device being different from any one of the at least one first terminal device;
   receiving a print command from the second terminal device, the print command including:
   image data indicative of an image to be printed; and
   sheet-specifying data specifying a sheet that is selected from the list of sheets;
   generating print data by using:
   the image data included in the print command; and
   a printing parameter registered in association with target sheet information in the storage device, the target sheet information being registration-sheet information that is registered in the storage device and is indicative of the sheet specified by the sheet-specifying data, the print data being used for printing the image on the sheet specified by the sheet-specifying data; and transmitting the print data to a printing device connected to the server via the network, wherein the registering registers, in the storage device, a first printing parameter and a second printing parameter in association with the registration-sheet information, the first printing parameter and the second printing parameter having a first evaluation value and a second evaluation value, respectively, wherein the first evaluation value is calculated from evaluation data indicative of one or more evaluations of one or more prior printing results using the first printing parameter, and the second evaluation value is calculated from evaluation data indicative of one or more evaluations of one or more prior printing results using the second printing parameter, wherein the generating generates the print data by using the first printing parameter when following conditions are met:

the sheet-specifying data specifies the one sheet indicated by the at least one piece of sheet information; and the first evaluation value indicates evaluation higher than evaluation indicated by the second evaluation value, and wherein the generating generates the print data by using the second printing parameter when following conditions are met:

the sheet-specifying data specifies the one sheet indicated by the at least one piece of sheet information; and the second evaluation value indicates evaluation higher than evaluation indicated by the first evaluation value.

2. The non-transitory computer-readable storage medium as claimed in claim 1, wherein the computer-readable instructions, when executed by the processor causes the server to further perform:

receiving evaluation data from the second terminal device when the sheet-specifying data specifies the one sheet indicated by the at least one piece of sheet information, the evaluation data being indicative of an evaluation of printing results using both the print data and the printing parameter that is used in the generating; and updating one of the first evaluation value and the second evaluation value by using the evaluation data received from the second terminal device, the first evaluation value being updated when the first printing parameter is used in the generating to generate the print data, the second evaluation value being updated when the second printing parameter is used in the generating to generate the print data.

3. The non-transitory computer-readable storage medium as claimed in claim 2, wherein the computer-readable instructions, when executed by the processor causes the server to further perform: transmitting screen data to the second terminal device when the sheet-specifying data specifies the one sheet indicated by the at least one piece of sheet information, the screen data instructing the second terminal device to transmit the evaluation data to the server.

4. The non-transitory computer-readable storage medium as claimed in claim 1, wherein the receiving of the at least one set of parameter-related data and the at least one piece of sheet information receives a plurality of sets of parameter-related data and a plurality of pieces of sheet information from a plurality of third terminal devices, respectively, the plurality of third terminal devices including the first terminal device, the plurality of pieces of sheet information being indicative of the one sheet, and wherein the determining determines a printing parameter on a basis of the plurality of sets of parameter-related data received from the plurality of third terminal devices.

5. The non-transitory computer-readable storage medium as claimed in claim 4, wherein the determining further determines another printing parameter when one of a first condition and a second condition is met after the registering registers the printing parameter, the first condition being a prescribed period of time having been elapsed, the second condition being the receiving of the at least one set of parameter-related data and the at least one piece of sheet information receiving a prescribed number of sets of the parameter-related data each associated with sheet information indicative of the one sheet, and wherein the registering further registers, in the storage unit, the another printing parameter in association with the registration-sheet information indicative of the one sheet.

6. The non-transitory computer-readable storage medium as claimed in claim 1, wherein the printing parameter includes a brightness correction profile and a color conversion profile, the brightness correction profile being used for correcting brightness, the color conversion profile being used for converting a color value defined in a first color space to a color value defined in a second color space different from the first color space, the second color space including a color component corresponding to a colorant, wherein the parameter-related data includes the brightness correction profile and the color conversion profile that the at least one first terminal device has used for printing, wherein the determining determines a combination of one brightness correction profile and one color conversion profile on a basis of at least one brightness correction profile and at least one color conversion profile that are received from the at least one first terminal device, and wherein the registering registers, as the printing parameter associated with the registration sheet information indicative of the one sheet, the determined combination of one brightness correction profile and one color conversion profile in the storage device.

7. The non-transitory computer-readable storage medium as claimed in claim 1, wherein the computer-readable instructions, when executed by the processor causes the server to further perform: acquiring regional information indicative of a region on which the at least one first terminal device is placed, wherein the registering registers the printing parameter in association with both the registration-sheet information and the regional information in the storage device, and wherein the generating generates the print data by using: the image data; and the printing parameter registered in the storage device in association with both the target sheet information and the regional information.

8. A server connected to a network and comprising: a processor; and a memory storing computer-readable instructions therein, the computer-readable instructions, when executed by the processor, causing the server to perform: receiving at least one set of parameter-related data and at least one piece of sheet information from at least one first terminal device connected to the server via the network, the at least one piece of sheet information being indicative of one sheet; determining a printing parameter on a basis of the at least one set of parameter-related data received from the at least one first terminal device; registering, in a storage device, the printing parameter in association with registration-sheet information indicative of the one sheet indicated by the at least one piece of sheet information; transmitting, to a second terminal device connected to the server via the network, a list of sheets that is indicated by at least one piece of registration-sheet information registered in the storage device, each of the at least one piece of registration-sheet information being indicative of a sheet, the second terminal device being different from any of the at least one first terminal device; receiving a print command from the second terminal device, the print command including: image data indicative of an image to be printed; and sheet-specifying data specifying a sheet that is selected from the list of sheets; generating print data by using: the image data included in the print command; and a printing parameter registered in association with target sheet information in the storage device, the target sheet information being registration-sheet information that is registered in the storage device and is indicative of the sheet specified by the sheet-specifying data, the print data being used for printing the image on the sheet specified by the sheet-specifying data; and transmitting the print data to a printing device connected to the server via the network, wherein the registering registers, in the storage device, a first printing parameter and a second printing parameter in association with the registration-sheet information, the first printing parameter and the second printing parameter having a first evaluation value and a second evaluation value, respectively, wherein the first evaluation value is calculated from evaluation data indicative of one or more evaluations of one or more prior printing results using the first printing parameter, and the second evaluation value is calculated from evaluation data indicative of one or more evaluations of one or more prior printing results using the second printing parameter, wherein the generating generates the print data by using the first printing parameter when following conditions are met: the sheet-specifying data specifies the one sheet indicated by the at least one piece of sheet information; and the first evaluation value indicates evaluation higher than evaluation indicated by the second evaluation value, and wherein the generating generates the print data by using the second printing parameter when following conditions are met: the sheet-specifying data specifies the one sheet indicated by the at least one piece of sheet information; and the second evaluation value indicates evaluation higher than evaluation indicated by the first evaluation value.

9. A method executed by a server connected to a network, the method comprising: receiving at least one set of parameter-related data and at least one piece of sheet information from at least one first terminal device connected to the server via the network, the at least one piece of sheet information being indicative of one sheet; determining a printing parameter on a basis of the at least one set of parameter-related data received from the at least one first terminal device; registering, in a storage device, the printing parameter in association with registration-sheet information indicative of the one sheet indicated by the at least one piece of sheet information; transmitting, to a second terminal device connected to the server via the network, a list of sheets that is indicated by at least one piece of registration-sheet information registered in the storage device, each of the at least one piece of registration-sheet information being indicative of a sheet, the second terminal device being different from any one of the at least one first terminal device; receiving a print command from the second terminal device, the print command including: image data indicative of an image to be printed; and sheet-specifying data specifying a sheet that is selected from the list of sheets; generating print data by using: the image data included in the print command; and a printing parameter registered in association with target sheet information in the storage device, the target sheet information being registration-sheet information that is registered in the storage device and is indicative of the sheet specified by the sheet-specifying data, the print data being used for printing the image on the sheet specified by the sheet-specifying data; and transmitting the print data to a printing device connected to the server via the network, wherein the registering registers, in the storage device, a first printing parameter and a second printing parameter in association with the registration-sheet information, the first printing parameter and the second printing parameter having a first evaluation value and a second evaluation value, respectively, wherein the first evaluation value is calculated from evaluation data indicative of one or more evaluations of one or more prior printing results using the first printing parameter, and the second evaluation value is calculated from evaluation data indicative of one or more evaluations of one or more prior printing results using the second printing parameter, wherein the generating generates the print data by using the first printing parameter when following conditions are met: the sheet-specifying data specifies the one sheet indicated by the at least one piece of sheet information; and the first evaluation value indicates evaluation higher than evaluation indicated by the second evaluation value, and wherein the generating generates the print data by using the second printing parameter when following conditions are met: the sheet-specifying data specifies the one sheet indicated by the at least one piece of sheet information; and the second evaluation value indicates evaluation higher than evaluation indicated by the first evaluation value.

* * * * *